US007013165B2

(12) United States Patent
Yoon et al.

(10) Patent No.: US 7,013,165 B2
(45) Date of Patent: Mar. 14, 2006

(54) ANTENNA ARRAY APPARATUS AND BEAMFORMING METHOD USING GPS SIGNAL FOR BASE STATION IN MOBILE TELECOMMUNICATION SYSTEM

(75) Inventors: Jae-Seung Yoon, Songnam-shi (KR); Kyong-Joon Chun, Seoul (KR); Byung-Jin Chun, Suwon-shi (KR)

(73) Assignee: Samsung Electronics Co., Ltd., (KR)

( * ) Notice: Subject to any disclaimer, the term of this patent is extended or adjusted under 35 U.S.C. 154(b) by 504 days.

(21) Appl. No.: 09/931,129

(22) Filed: Aug. 16, 2001

(65) Prior Publication Data

US 2002/0147032 A1  Oct. 10, 2002

(30) Foreign Application Priority Data

Aug. 16, 2000  (KR)  ..................................... 2000-4

(51) Int. Cl.
*H04M 1/00* (2006.01)
(52) U.S. Cl. ..................... 455/561; 455/562; 455/437; 455/13.3; 455/19; 455/25; 455/82; 455/88; 455/91; 455/101; 455/103; 455/104; 455/110; 455/121; 342/372; 342/377; 342/370; 375/141; 375/144; 375/147; 375/150

(58) Field of Classification Search ........ 342/368–372, 342/322; 455/450, 562, 561, 432, 132, 121, 455/110, 102, 104, 103; 325/141, 144, 142, 325/150
See application file for complete search history.

(56) References Cited

U.S. PATENT DOCUMENTS 5,400,037 A * 3/1995 East ........................... 342/372
6,426,720 B1 * 7/2002 Ross et al. .................. 342/372
6,633,762 B1 * 10/2003 Rauscher .................... 455/437

* cited by examiner

*Primary Examiner*—Joseph Feild
*Assistant Examiner*—David Q. Nguyen
(74) *Attorney, Agent, or Firm*—Dilworth & Barrese LLP

(57) ABSTRACT

There is provided an antenna array apparatus using a GPS signal in a base station and a beamforming method thereof. In the antenna array apparatus, a GPS signal processor receives GPS position information from a mobile station and calculates the position information of the mobile station. A signal processor calculates a weight vector using the position information to form a transmission/reception beam. A transmission/reception beamformer forms the transmission/reception beam according to the weight vector.

4 Claims, 10 Drawing Sheets

ANTENNA ARRAY APPARATUS AND BEAMFORMING METHOD USING GPS SIGNAL FOR BASE STATION IN MOBILE TELECOMMUNICATION SYSTEM

PRIORITY

This application claims priority to an application entitled "Antenna Array Apparatus and Beamforming Method Using GPS Signal for Base Station in Mobile Telecommunication System" filed in the Korean Industrial Property Office on Aug. 16, 2000 and assigned Ser. No. 2000-47256, the contents of which are hereby incorporated by reference.

BACKGROUND OF THE INVENTION

1. Field of the Invention

The present invention relates generally to an antenna array apparatus and a method thereof in a mobile telecommunication system, and in particular, to an antenna array apparatus and a beamforming method using a GPS signal in a base station (BS).

2. Description of the Related Art

The rapid increase in the number of users in the present mobile telecommunication field imposes capacity constraints on mobile telecommunication systems. Mobile telecommunication technology has transitioned from the narrow band second-generation phase to the wide band third-generation phase to increase capacity. At the same time, antenna array signal processing techniques are attracting more attention because they can further increase capacity by time-spatial signal processing.

When a conventional omni-directional antenna is used, a signal from a mobile station (MS) interferes with signals from other mobile stations. However, use of an antenna array apparatus enables selective transmission/reception of a signal to/from a particular direction. Consequently, the interference with other mobile stations is reduced and more users can be accommodated.

Signal processing by the antenna array apparatus, applicable on forward and reverse links, is usually adopted in a base station due to the physical size of the apparatus and calculation requirements in a mobile telecommunication system including base stations and mobile stations. The basic structures of a reverse (receiving) beamformer and a forward (transmitting) beamformer are illustrated respectively in FIGS. 2A and 2B. As shown in FIGS. 2A and 2B, antenna devices in the transmitting beamformer and the receiving beamformer having their respective weights and beam patterns in transmitting/receiving arrays are controlled by adjusting those weights. For convenience sake in mathematical terms, a set of weights is called a weight vector.

Many methods have been proposed to calculate an optimum weight vector for use in forming a receiving beam from an intended direction in the receiving antenna array system.

DOA (Direction of Arrival)-based beamforming techniques include maximum SINR beamforming, ML beamforming, and MMSE beamforming which differ in cost functions for achieving an optimum vector. These techniques are readily interpreted theoretically but have the problem of high calculation requirement for eigen decomposition and multi-dimensional, non-linear optimization of an input correlation matrix necessary to implement the techniques.

Another feasible approach is use of a training signal. An LMS (Least Mean Squares) algorithm and a DMI (Direct Matrix Inversion) algorithm are implemented based on training signals. The training signal methods, though it is not necessary to know the DOA methods and an array structure, may have problems related to preliminary symbol and carrier recovery caused by using additional training signal, decreasing channel efficiency.

Weight vectors are also achieved using the characteristics or structure of a signal, such as a CMA (Constant Modulus Algorithm) and an FA (Finite Alphabet). These methods are not greatly influenced by a variety of propagation situations and require no knowledge of the DOA methods and an array structure. However, they have problems in convergence speed and performance.

Meanwhile, calculation of an optimum weight vector is a challenging issue to the transmitting antenna array system to transmit a signal in an intended direction. As opposed to reverse channel estimation, forward channel estimation is difficult in a base station. There are many suggestions to solve this problem.

In the conceptively simplest way, a mobile station estimates a forward channel in a mobile station and transmits the information on a reverse channel. Then a base station calculates a transmission array weight vector based on the received information. Considering the trend of miniaturization and lightweight in mobile stations, this method imposes too high of a calculation requirement on the mobile station.

As an alternative, weight vectors have been calculated using blind channel estimation without feedback information from a mobile station. The blind channel estimation is difficult to be put to wide use because of problems related to local minimum, convergence speed, and initial acquisition. In this context, a semi-blind method has been suggested by combining the above two methods. The semi-blind method aims at maximization of the forward channel estimation capability of a base station and system capacity using part of feedback information obtained with the least calculation requirement from a mobile station.

A weight vector for a reverse channel can be applied to a forward channel. This simple method has limitations in increasing capacity when the difference between forward link and reverse link carrier frequences is greater than a correlation bandwidth in an FDD (Frequency Division Duplex) structure using different frequencies for the forward and reverse links. The method of applying a reverse weight vector to forward channels can be improved by defining a function capable of compensating for the transmission-reception frequency difference between a weight vector for a reception antenna array and a weight vector for a transmission antenna array and achieving a weight vector for the transmission antenna array. However, considering the time varying characteristic of a spatial-time channel, the appropriate function is difficult to be defined.

Some mobile stations in the mobile communication system are equipped with GPS receivers. They receive their position information from GPS satellites and provide the position information to users only, not to a base station.

SUMMARY OF THE INVENTION

An object of the present invention is, therefore, to provide a beamforming apparatus and method in which a GPS receiver-equipped mobile station transmits GPS position information to a base station and the base station forms a transmission/reception beam based on the GPS position information in a mobile communication system using an antenna array.

Another object of the present invention is to provide a beamforming apparatus and method in which a base station calculates the coordinates of a mobile station from GPS position information received from the mobile station, derives the position and angle of the mobile station from the coordinates, calculates a weight vector based on the position and angle information, and forms a transmission/reception beam with the weight vector in the direction of the mobile terminal in a mobile communication system using an antenna array.

A further object of the present invention is to provide a beamforming apparatus and method in which a base station calculates the coordinates of a mobile station from GPS position information received from the mobile station, derives the position angle of the mobile station and the distance to the mobile station from the coordinates, calculates a weight vector based on the position and angle information, and forms a transmission/reception beam with the weight vector in the direction of the mobile terminal in a mobile communication system using an antenna array.

Still another object of the present invention is to provide a beamforming apparatus and method in which a base station calculates the absolute coordinates of a mobile station from GPS position information received from the mobile station, selects a transmission/reception weight vector corresponding to coordinates nearest to the absolute mobile station coordinates from a weight vector database, and forms a transmission/reception beam with the weight vector in the direction of the mobile terminal in a mobile communication system using an antenna array.

The foregoing and other objects of the present invention are achieved by an antenna array apparatus using a GPS signal in a base station and a beamforming method thereof. In the antenna array apparatus, a position information generator receives GPS position information from a mobile station and generates the position information of the mobile station. An array signal processor calculates a weight vector using the position information to form a transmission beam. A forward/reverse processor has a transmission/reception beamformer, and forms a transmission/reception beam according to the weight vector in the direction of the mobile station.

According to one aspect of the present invention, in the antenna array apparatus, a position information generator receives GPS position information from the mobile station and generates the position information of the mobile station. A relative coordinates calculator calculates the relative coordinates of the mobile station with respect to the absolute coordinates of the base station from the position information. A position angle calculator calculates the position angle of the mobile station with respect to the base station from the relative coordinates of the mobile station. A weight vector calculator calculates a weight vector using the position angle of the mobile station to form a beam. A beamformer forms a beam according to the weight vector in an intended direction.

According to another aspect of the present invention, in the antenna array apparatus, a position information generator receives GPS position information from the mobile station and generates the position information of the mobile station. A relative coordinates calculator calculates the relative coordinates of the mobile station from the position information. A position angle calculator calculates the position angle of the mobile station with respect to the base station from the relative coordinates of the mobile station. A distance calculator calculates the distance between the mobile station and the base station from the relative coordinates of the mobile station. A beam width controller determines a transmission/reception beam width increment or decrement according to the distance between the mobile station and the base station. A weight vector calculator calculates a weight vector using the position angle of the mobile station and a beam width control signal to form a beam. A beamformer forms a beam according to the weight vector in an intended direction.

According to a further aspect of the present invention, in the antenna array apparatus, a weight vector storage stores optimum weight vectors versus position coordinates within a predetermined base station area in the form of a table. A processor selects a weight vector corresponding to the position information of the mobile station or a weight vector most approximate to the weight vector corresponding to the position information from the table. A beamformer forms a beam according to the selected weight vector in an intended direction.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1A:
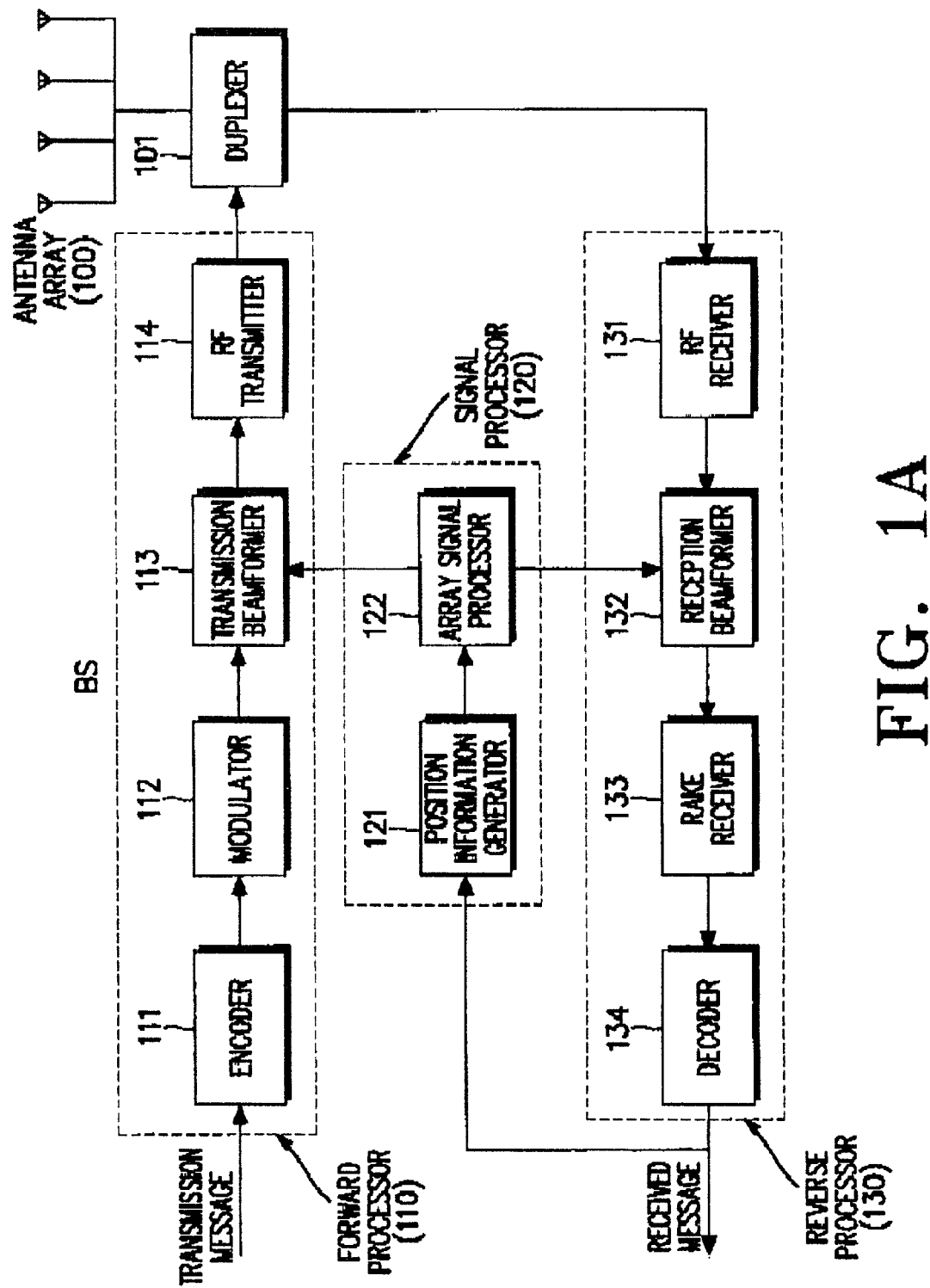
FIG. 1A is a block diagram of an antenna array apparatus for forming a transmission/reception beam using a CPS signal in a base station of a mobile communication system according to the present invention.

Preferred embodiments of the present invention will be described hereinbelow with reference to the accompanying drawings. In the following description, well-known functions or constructions are not described in detail since they would obscure the invention in unnecessary detail.

A GPS receiver measures the PR (Pseudo-Range) of each GPS satellite from the arrival time of signals received from a plurality of GPS navigation satellites (four GPS satellites in the present invention) and transmits PR measurements to a base station. The base station forms four spheres where the GPS receiver may be located from each GPS satellite based on the received PR information and the GPS ephemeris and determines the position of the GPS receiver by calculating the intersection of the four spheres.

The accuracy of a GPS signal in the past was generally only about 100 m and as low as tens of hundreds of meters in a city due to a position information error artificially given by the U.S. Department of Defense (DOD) for military security. To solve this problem, DGPS (Differential GPS) was suggested. DGPS is a technique used to improve positioning or navigation accuracy by determining the positioning error through a master station that knows the accurate position and propagating the positioning error to other GPS receivers so that they can compensate for the positioning error.

However, since the DOD released the selective availability of a GPS signal as of 12:00 May 1, 2000 (eastern time), positioning information with a high resolution of a positioning error 20 m or less can be provided without relying on DGPS. Furthermore, with the U.S. Federal Communications Commission (FCC)'s mandate E911, E911 services start on Oct. 1, 2001 to provide valuable information concerning the location of a mobile station in emergency. Hence, mobile stations equipped with GPS receivers are actively developed.

A mobile station should include a GPS receiver according to the present invention. It is assumed that the GPS receiver-equipped mobile station knows a PR between each GPS satellite and the mobile station from received GPS signals, and a base station receives the PRs and detects the orthogonal relative coordinates $(x_M, y_M, z_M) = (x'_M - x_B, y'_M - y_B, z'_M - z_B)$ with the orthogonal position coordinates of the base station $(x_B, y_B, z_B)$ set as an origin. Here, $(x'_M, y'_M, z'_M)$ indicates the absolute coordinates of the mobile station to the GPS satellites. For PR calculation and calculation of position coordinates from PRs, see B. W. Parkinson, and J. J. Spilker, Jr. "Global Positioning. System: Theory and Applications", AIAA, Washington, D.C., 1996.

The azimuth angle $\phi$ and elevation angle $\theta$ along the z axis of the mobile station with respect to the position of the base station are calculated by $$\phi = \arctan\left(\frac{y_M}{x_M}\right), \quad \theta = \left(\frac{\sqrt{x_M^2 + y_M^2}}{z_M}\right) \quad (1)$$

If the base station has M antenna devices, the relative position of an mth antenna device with respect to the base station is $(x_m, y_m, z_m)$, and the first antenna device is set as a reference antenna, the phase difference between a plane wave received at the mth antenna device of the base station and a plane wave received at the reference antenna device from the mobile station located in the direction of $(\theta, \phi)$ from the base station is $$\Delta\psi_m = \frac{2\pi}{\lambda_R}\Delta d_m = \frac{2\pi}{\lambda_R}(x_m\cos\phi\sin\theta + y_m\sin\phi\sin\theta + z_m\cos\theta) \quad (2)$$

where $\lambda_R$ is the wavelength of a received signal (see J. C. Liberti, Jr. and T. S. Rappaport, "Smart Antenna for Wireless Communications: IS-95 and Third Generation CDMA Applications", Prentice Hall, Upper Saddle River, N.J., 1999).

Therefore, if the mobile station transmits a baseband complex signal $s_R(t)$, the baseband complex signal $r_R(t)$ of the reception array antenna of the base station is calculated as below on the assumption of an ideal AGWN (Additive Gaussian White Noise) channel.

$$r_R(t) = \sum_{i=1}^{M} w_{Ri}^* s_R(t)\exp(-j\Delta\psi_i) + n(t) = s_R(t)w_R^H a(\theta, \phi, \lambda_R) + n(t) \quad (3)$$

where $n(t)$ is AGWN, $w_{Ri}$ is a reception weight for an ith antenna, superscript * represents a complex conjugate, superscript H represents a matrix Hermitian operator, $w_R = [w_{R1}, w_{R2}, \ldots w_{RM}]^T$ is a reception weight vector, and $$a(\theta, \phi, \lambda_R) = [e^{-j\Delta\psi_1}, e^{-j\Delta\psi_2} \ldots e^{-j\Delta\psi_M}]^T$$

is a steering vector.

In Eq. 3, an array signal processing gain for a signal is the highest when the inner product of the weight vector and the steering vector is the highest. If it is assumed that the weight vector has a unit norm to avoid the trivial solution of an optimum weight vector, an optimum weight vector for the reception antenna array in the base station for the mobile station located in the direction of $(\theta, \phi)$ is given by $$w_R = k_R a(\theta, \phi, \lambda_R) \quad (4)$$

where $k_R$ is an arbitrary positive real number. If the weight vector has a unit norm to determine $k_R$, the optimum weight vector of Eq. 4 can be $$w_R = \frac{a(\theta, \phi, \lambda_R)}{\|a(\theta, \phi, \lambda_R)\|} \quad (5)$$

Meanwhile, if the base station transmits a baseband complex signal $s_T(t)$, the baseband complex signal $r_T(t)$ of the reception antenna of the mobile station is calculated as below similarly to Eq. 3 on the assumption of an ideal AGWN channel.

$$r_T(t) = \sum_{i=1}^{M} w_{Ti}^* s_T(t)\exp(-j\Delta\psi_i) + n_T(t) = s_T(t)w_T^H a(\theta, \phi, \lambda_T) + n_T(t) \quad (6)$$

where $n_T(t)$ is AGWN, $w_{Ti}$ is a transmission weight for an ith antenna, $w_T = [w_{T1}, W_{T2}, \ldots w_{TM}]^T$ is a transmission weight vector, $$a(\theta, \phi, \lambda_T) = [e^{-j\Delta\psi_{i1}}, e^{-j\Delta\psi_{T2}} \ldots e^{-j\Delta\psi_{TM}}]^T$$

is a transmission steering vector, and $\lambda_T$ is the wavelength of a transmission signal. Therefore, on the same principle of maximizing an array signal processing gain, a weight vector for the transmission antenna array of the base station is computed by $$w_T = k_T a(\theta, \phi, \lambda_T) \tag{7}$$

where $k_T$ is an arbitrary positive real number. If the weight vector has a unit norm to determine $k_T$, the optimum weight vector of Eq. 7 can be $$w_T = \frac{a(\theta, \phi, \lambda_T)}{\|a(\theta, \phi, \lambda_T)\|} \tag{8}$$

where $\lambda_T$ is the wavelength of the transmission signal.

Figure 1B:
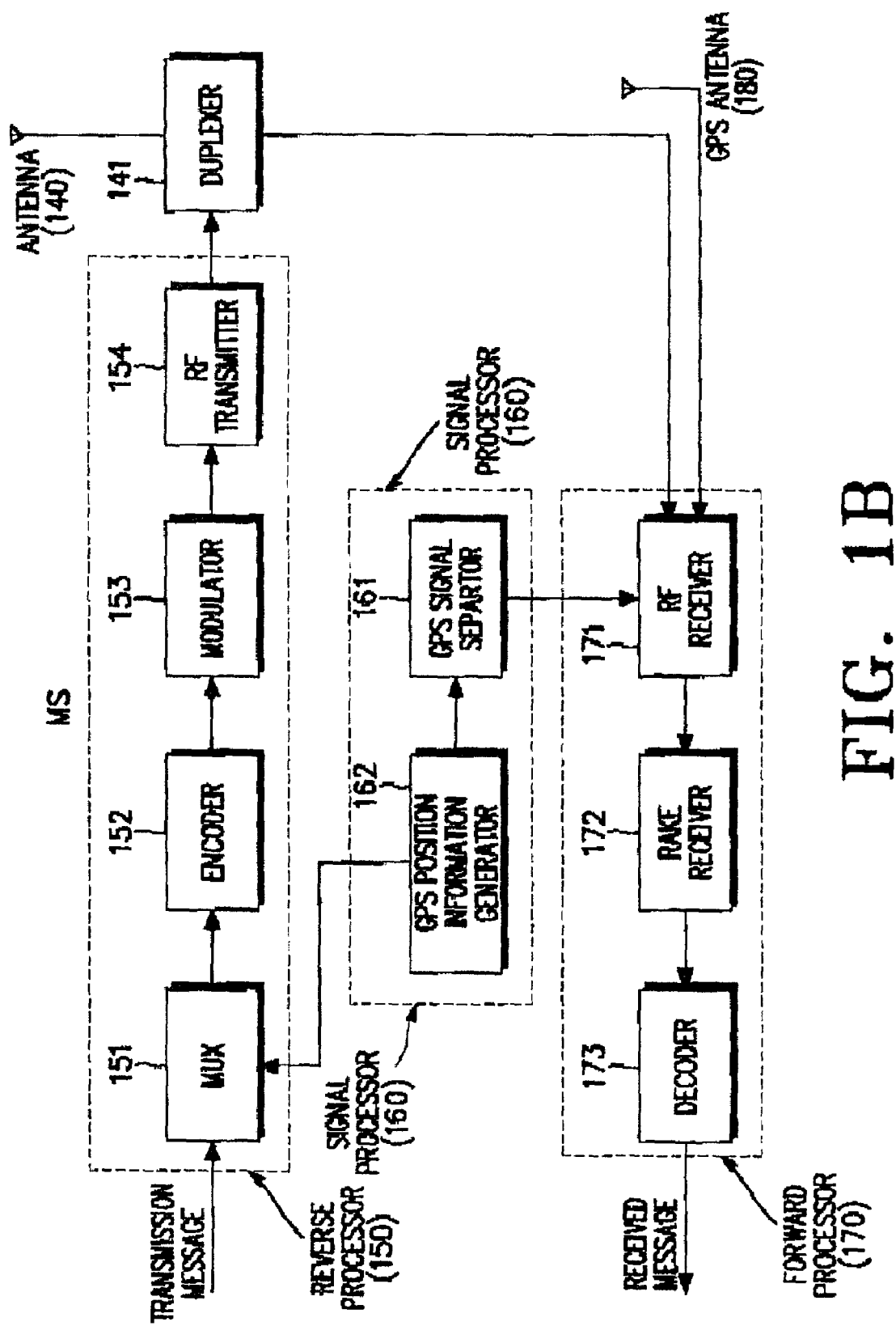
FIG. 1B is a block diagram of a mobile station having a GPS receiver in the mobile communication system.
Figure 2A:
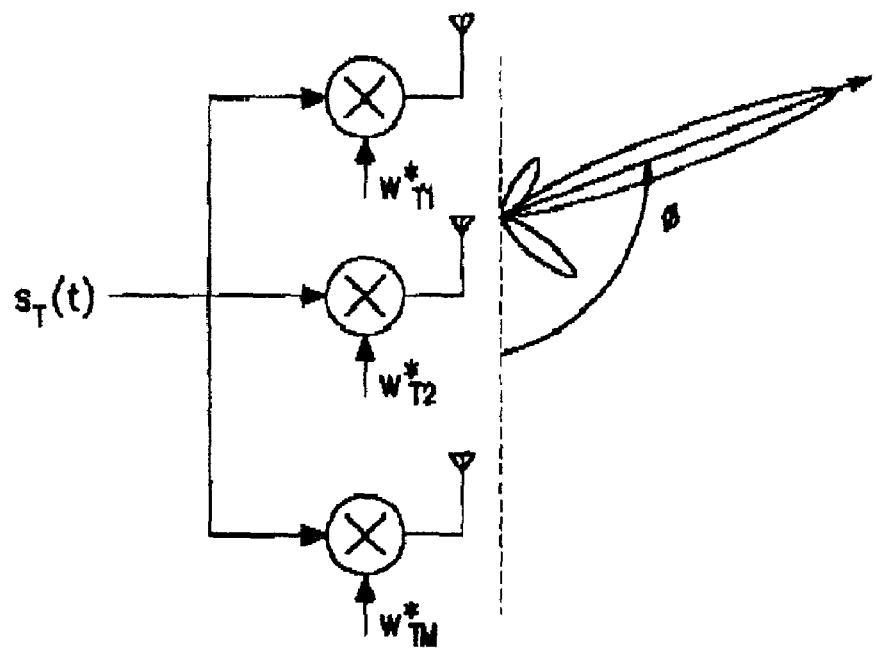
FIGS. 2A and 2B illustrate the characteristics of a transmission beamformer and a reception beamformer in the antenna array apparatus.
Figure 2B:
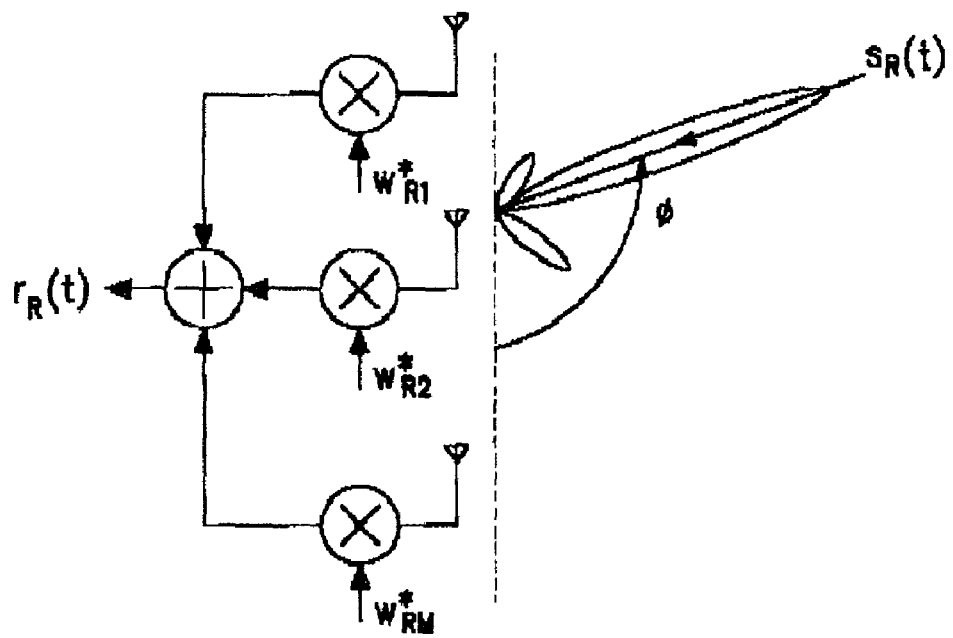
Figure 6:
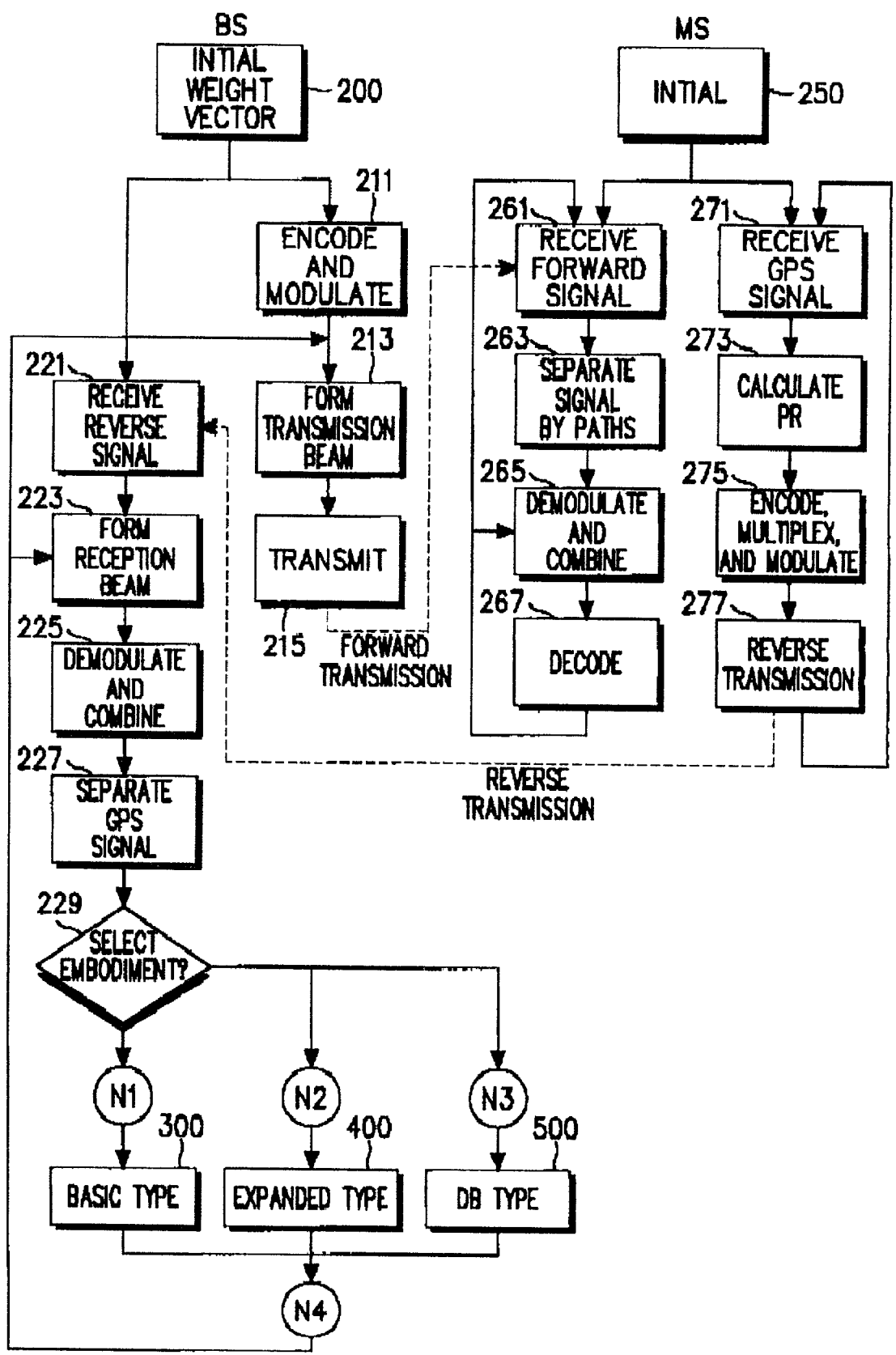
FIG. 6 is a flowchart illustrating the operation of the antenna array apparatus in the base station according to the present invention.

FIG. 1A is a block diagram of an antenna array apparatus for forming a transmission beam using a GPS signal in a base station of a mobile communication system according to the present invention and FIG. 1B is a block diagram of a mobile station with a GPS receiver in the mobile communication system. FIG. 6 is a flowchart illustrating a transmission/reception beam forming procedure in the base station apparatus of FIG. 1A and in the mobile station of FIG. 1B.

Referring to FIG. 1B, a duplexer 141 transmits a transmission signal to an antenna 140 and a signal received through the antenna 140 to an RF receiver 171. A GPS antenna 180 receives GPS signals from GPS satellites. The RF receiver 171 downconverts the frequencies of the signal received from the duplexer 141 and the GPS signal. A RAKE receiver 172 combines and demodulates multi-path signals received from the RF receiver 171. A decoder 173 decodes the demodulated signal. These components constitute a forward processor 170.

A GPS signal separator 161 separates GPS signals from the output of the RF receiver 171 and acquires and tracks the GPS signals. A GPS position information generator 162 calculates a PR from the mobile station to each GPS satellite based on the GPS signals and outputs the PR measurements as GPS position information. These components constitute a signal processor 160.

A multiplexer (MUX) 151 receives a transmission message and the GPS position information and multiplexes them. An encoder 152 channel-encodes the output of the MUX 151. A modulator 153 modulates the encoded signal received from the encoder 152. An RF transmitter 154 upconverts the frequency of the modulated signal and feeds it to the duplexer 141. These components constitute a reverse processor 150.

The antenna 140 can be incorporated with the GPS antenna 180. The forward processor 170 functions as a receiver and the reverse processor 150 functions as a transmitter in the mobile station.

As shown in FIG. 1B, the mobile station according to the present invention is provided a GPS receiver. After tracking and acquiring GPS signals from the GPS satellites, the mobile station calculates the PRs to the GPS satellites, generates GPS position information based on the PR measurements, and reports the GPS position information to the base station in a transmission message from the reverse processor 150.

Referring to FIG. 1A, an antenna array 100 in the base station is composed of M antenna devices. A duplexer 101 outputs a transmission signal to the antenna array 100 and a signal received through the antenna array 100 to an RF receiver 131. The RF receiver 131 downconverts the frequency of the signal received from the duplexer 101. A reception beamformer 132 forms a reception beam using a weight vector received from an array signal processor 122 and receives the signal from the RF receiver 131. The reception beamformer 132 receives signals through the M antenna devices, multiplies each antenna device output signal by a corresponding reverse weight generated from a signal processor 120, and sums the products, thereby obtaining a final array output signal. A rake receiver 133 combines and demodulates signals received from the reception beamformer 132. A decoder 134 decodes the demodulated signal. These components constitute a reverse processor 130.

A position information generator 121 separates the PR information generated from the mobile station from the message received from the decoder 134 and calculates the position of the mobile station (GPS position) from the PR information. An array signal processor 122 calculates weight vectors for the transmission/reception array from the GPS position information received from the position information generator 121 and feeds the weight vectors to a transmission beamformer 113 and the reception beamformer 132. These components constitute the signal processor 120.

An encoder 111 channel-encodes a transmission message. A modulator 112 modulates the encoded signal. The transmission beamformer 113 forms a transmission beam using weight vectors received from the array signal processor 122 and transmits the transmission signal in the direction of the transmission beam. The transmission beamformer 113 generates as many duplicates of the transmission signal as the M antenna devices, multiplies the duplicate signals by the respective forward weights, and transmits them through the antenna array. An RF transmitter 114 upconverts the frequencies of the transmission signals and outputs the upconverted signals to the duplexer 101. These components constitute a forward processor 110.

The array signal processor 122 can be implemented with a weight vector database. In this case, the weight vector database must have weight vectors corresponding to GPS position information. The forward processor 110 functions as a transmitter and the reverse processor 130 functions as a receiver in the base station.

As shown in FIG. 1A, the base station according to the present invention is provided with a transmission/reception antenna array, calculates weight vectors for the antenna array from GPS position information received from the mobile station, and forms a transmission/reception beam according to the weight vectors in the direction of the mobile station. While the base station forms a transmission/reception beam according to the description of FIG. 1A, the antenna array system can be constituted of a transmission beamformer or a reception beamformer alone.

With reference to FIG. 6, the operation of the mobile communication system shown in FIGS. 1A and 1B will be described.

In FIG. 6, the base station sets a transmission/reception weight vector to an initial value in step 200 and the mobile station also performs an initialization operation in step 250.

In step 271, the forward processor 170 of the mobile station transmits GPS signals received through the GPS antenna 180 to the signal processor 160. Then, the signal processor 160 calculates PRs from the GPS signals in step 273 and the reverse processor 150 subjects the PR information and a transmission message to multiplexing, encoding, and modulation in step 275. In step 277, the modulated signal is transmitted to the base station on the reverse link.

In step 221, the reverse processor 130 of the base station receives the reverse signal. The signal processor 120 of the base station controls the reception beamformer 132 to form a reception beam in step 223 and the reverse processor 130 demodulates received multi-path signals and combines the demodulated signals in step 225. The signal processor 120 separates a GPS signal from the demodulated signal in step 227 and selects a method of calculating weight vectors to form a transmission/reception beam in step 229. While there are many ways to form the transmission/reception beam, a basic type, an expanded type, and a DB (DataBase) type will be described in the embodiments of the present invention. The basic type operation in step 300 of FIG. 6 will be described in detail with reference to FIGS. 3 and 7, the expanded type operation in step 400 with reference to FIGS. 4 and 8, and the DB type operation in step 500 with reference to FIGS. 5 and 9.

After calculating weight vectors, the signal processor 120 controls the reception beamformer 132 to form a reception beam in step 223 and controls the transmission beamformer 113 to form a transmission beam in step 213. The above procedure is repeatedly performed.

The forward processor 110 of the base station encodes and modulates a transmission message, forms the transmission beam determined by the signal processor 120, and transmits the transmission message in steps 211 through 215. Then, the forward processor 170 of the mobile station demodulates a signal from each path, combines the demodulated signals, and decodes the combined signal in steps 261 through 267.

As described above, the mobile station first receives GPS signals, generates PR information from the GPS signals, multiplexes the PR information with a transmission message, and transmits the multiplexed signal to the base station. Then the base station receives multi-path reverse signals, combines them, separates periodically received GPS signals from the combined input signal, and calculates transmission/reception weight vectors and forms transmission/reception beams based on the GPS position information. These procedures are repeated.

While the antenna array system of the base station in the mobile communication system can be implemented in many ways, the basic type, the expanded type, and the DB type will be contemplated as a first through third embodiments of the present invention.

Basic Type (First Embodiment)

Figure 3:
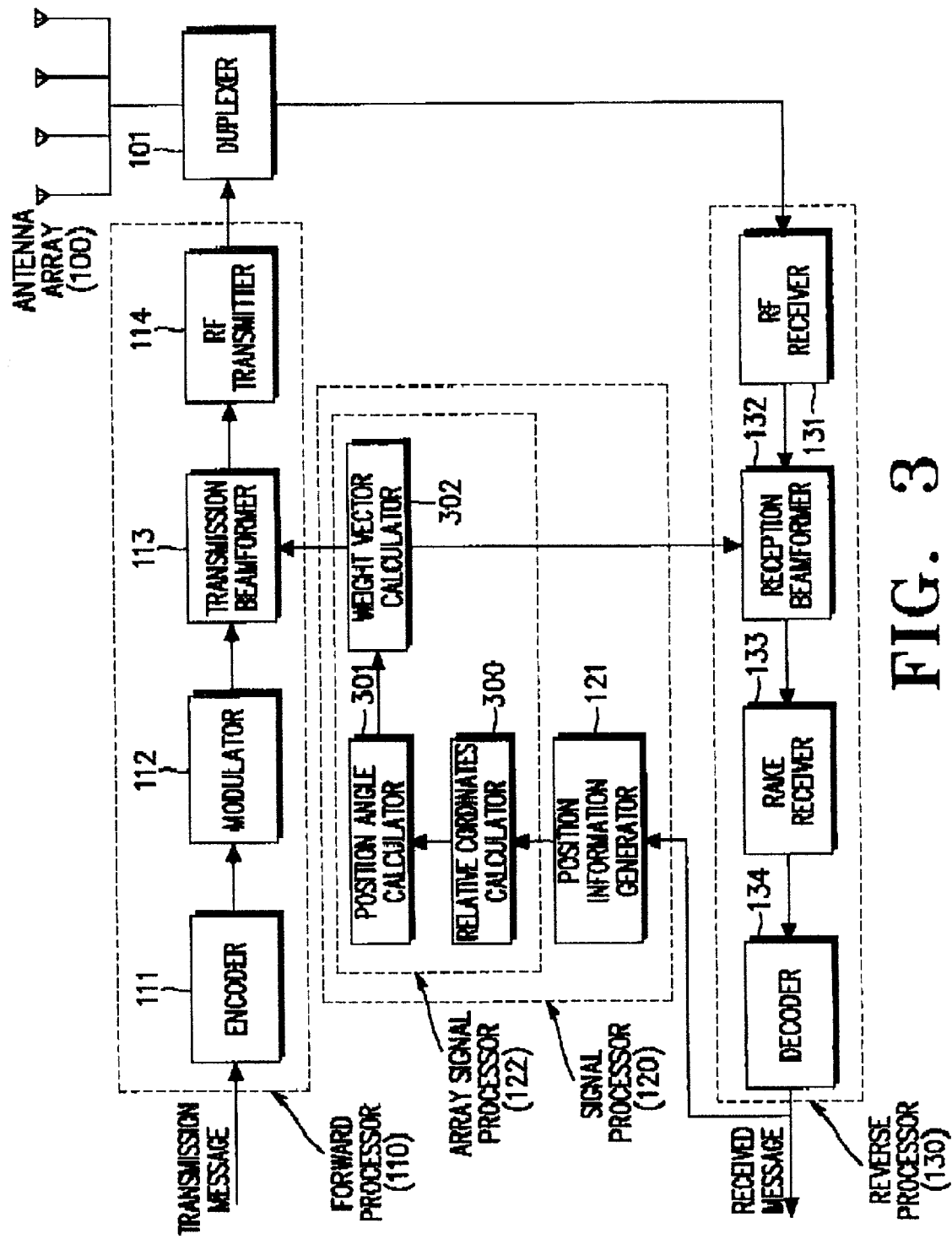
FIG. 3 is a block diagram of an embodiment (basic type) of the antenna array apparatus for forming a transmission/reception beam using a GPS signal in the mobile communication system according to the present invention.
Figure 7:
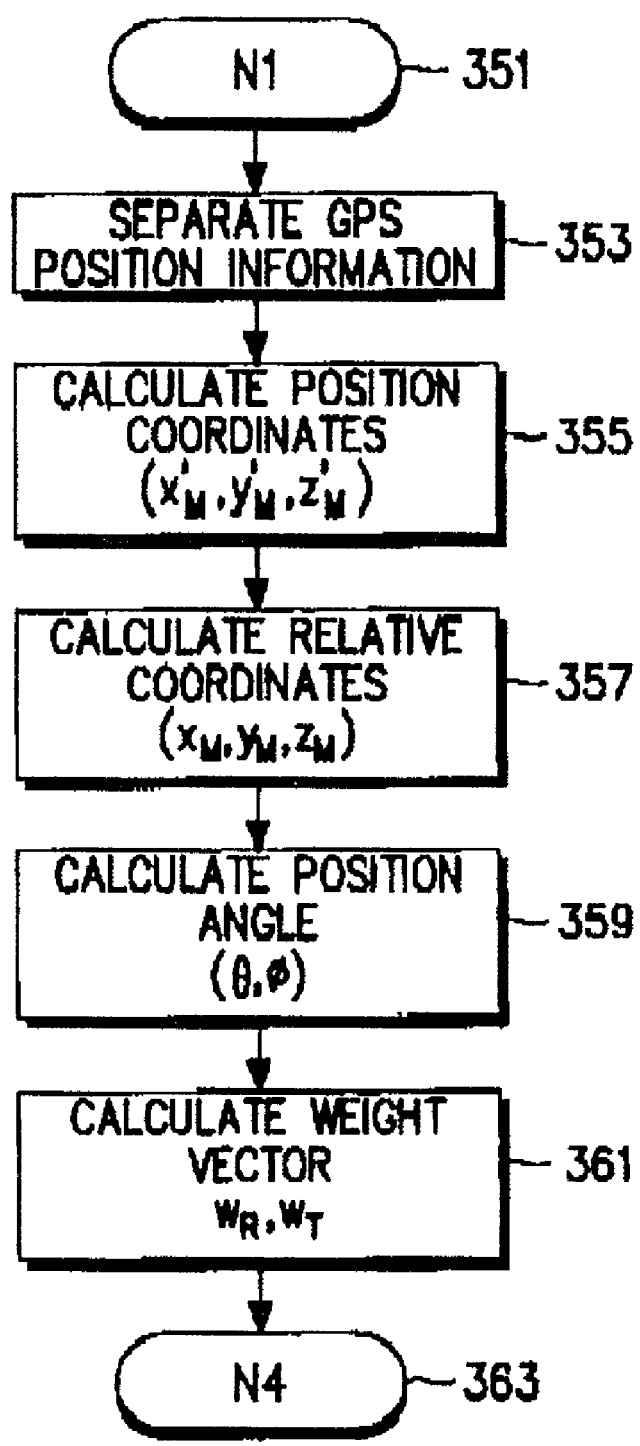
FIG. 7 is a flowchart illustrating transmission/reception beamforming using a GPS signal in the antenna array apparatus of the base station according to the first embodiment of the present invention.

FIGS. 3 and 7 illustrate respectively the structure and operation of a base station according to a first embodiment of the present invention. In accordance with the first embodiment, the base station obtains the absolute coordinates of the mobile station from GPS information received from the mobile station and converts the absolute coordinates to relative coordinates with respect to the position of the base station. Then, the base station calculates the position angle of the mobile station using the relative coordinates of mobile station, calculates transmission/reception weight vectors according to the position angle, and forms transmission/reception beams in the direction of the mobile station according to the weight vectors.

In the base station, a transmission message is transmitted through the encoder 111, the modulator 112, the, transmission beamformer 113, the RF transmitter 114, the duplexer 101, and the antenna array 100. A message received from the mobile station through the antenna array 100 is recovered through the duplexer 101, the RF receiver 131, the reception beamformer 132, the rake receiver 133, and the decoder 134. That is, the structures and operations of the forward processor 110 and the reverse processor 130 in the first embodiment of the present invention are the same as shown in FIG. 1A.

The position information generator 121 receives a message from the decoder 134, separates PR information generated in the mobile station from the received message, calculates GPS position information of the mobile station from the PR information, and generates the position coordinates of the mobile station. The array signal processor 122 includes a relative coordinates calculator 300, a position angle calculator 301, and a weight vector calculator 302. The array signal processor 122 calculates weight vectors for the transmission/reception antenna array from the GPS position information received from the position information generator 121 to form transmission/reception beams and feeds the weight vectors to the transmission beamformer 113 and the reception beamformer 132. The relative coordinates calculator 300 obtains the 2D or 3D relative coordinates of the mobile station with respect to the position of the base station from the GPS position information of the mobile station and the base station. The position angle calculator 301 calculates the position angle of the mobile station with respect to the base station from the relative coordinates of the mobile station. The weight vector calculator 302 calculates weight vectors using the position angle of the mobile station and feeds the weight vectors to the transmission beamformer 113 and the reception beamformer 132.

In operation, the position information generator 121 separates PR information from a message received from the decoder 134 of the reverse processor 130, obtains the orthogonal position coordinates $(x'_M, y'_M, z'_M)$ of the mobile station using the GPS ephemeris known to the base station and the PR information, and outputs the orthogonal position coordinates to the array signal processor 122.

For the input of the orthogonal position coordinates $(x'_M, y'_M, z'_M)$ of the mobile station, the relative coordinates calculator 300 of the array signal processor 122 calculates the relative position coordinates $(x_M, y_M, z_M)$ with respect to the position coordinates of the base station. The position angle calculator 301 calculates the position angle $(\theta, \phi)$ of the mobile station to the base station from the relative position coordinates $(x_M, y_M, z_M)$ of the mobile station according to Eq. 1. The weight vector calculator 302 calculates weight vectors, from the position angle $(\theta, \phi)$ by Eq. 2, Eq. 4, and Eq. 7. The transmission beamformer 113 and the reception beamformer 132 form a transmission beam and a reception beam according to the weight vectors in the direction of the mobile station.

Referring to FIG. 7, the decoder 134 of the reverse processor 130 in the base station generates a decoded input message in step 351. The signal processor 120 separates the PR information from the input message in step 353 and generates the orthogonal position coordinates $(x'_M, y'_M, z'_M)$ of the mobile station from the PR information using the known GPS ephemeris in step 355. In step 357, the signal processor 120 calculates the relative position coordinates $(x_M, y_M, z_M)$ of the mobile station with respect to the known position coordinates of the base station from the orthogonal position coordinates $(x'_M, y'_M, z'_M)$ of the mobile station.

The signal processor 120 calculates the position angle (θ, φ) of the mobile station with respect to the base station using the relative position coordinates ($x_M$, $y_M$, $z_M$) of the mobile station by Eq. 1 in step 359, and calculates the weight vectors from the position angle (θ, φ) by Eq. 2, Eq. 4, and Eq. 7 in step 361. The transmission beamformer 113 and the reception beamformer 132 form a transmission beam and a reception beam according to the weight vectors in the direction of the mobile station in step 363.

Expanded Type (Second Embodiment)

Figure 4:
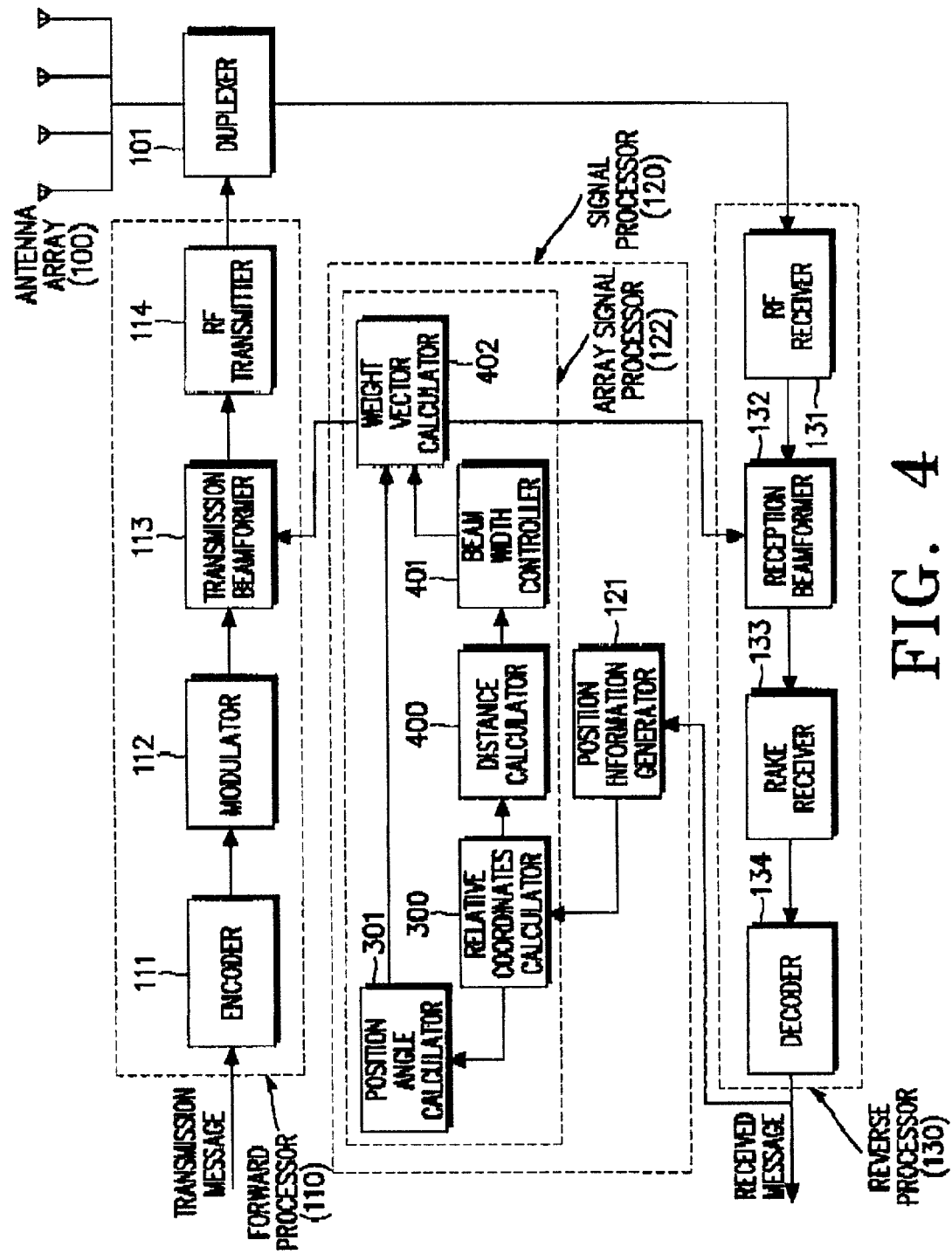
FIG. 4 is a block diagram of another embodiment (expanded type) of the antenna array apparatus for forming a transmission/reception beam using a GPS signal in the mobile communication system according to the present invention.
Figure 8:
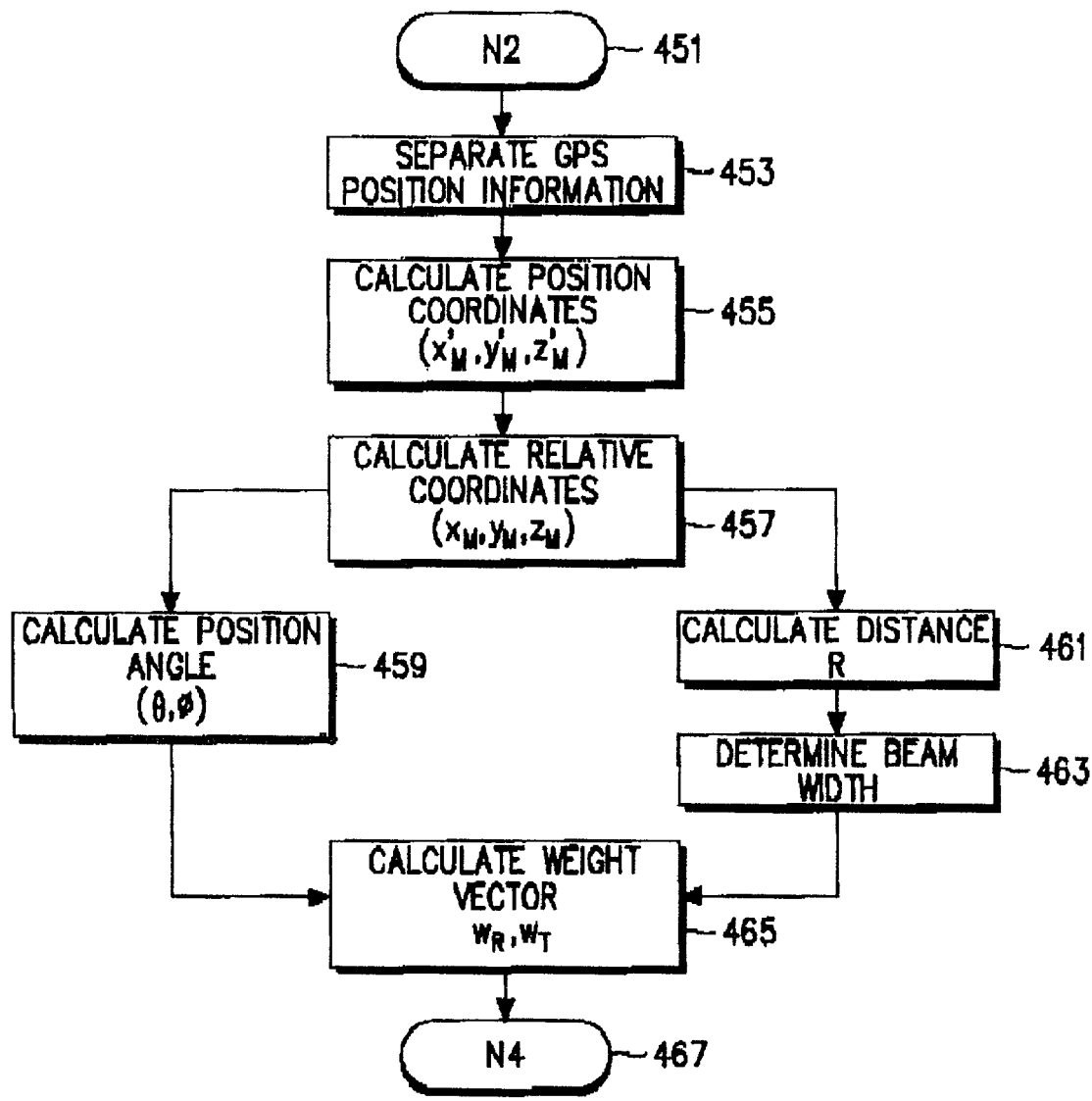
FIG. 8 is a flowchart illustrating transmission/reception beamforming using a GPS signal in the antenna array apparatus of the base station according to the second embodiment of the present invention.

FIGS. 4 and 8 illustrate respectively the structure and operation of a base station according to a second embodiment of the present invention. In accordance with the second embodiment, the base station obtains the absolute coordinates of the mobile station from GPS information received from the mobile station and converts the absolute coordinates to relative coordinates with respect to the position of the base station. Then, the base station calculates the position angle of the mobile station and the distance to the mobile station using the relative coordinates of mobile station, calculates transmission/reception weight vectors according to the position angle and the distance, and forms transmission/reception beams in the direction of the mobile station according to the weight vectors.

In the base station, a transmission message is transmitted through the encoder 111, the modulator 112, the transmission beamformer 113, the RF transmitter 114, the duplexer 101, and the antenna array 100. A message received from the mobile station through the antenna array 100 is recovered through the duplexer 101, the RF receiver 131, the reception beamformer 132, the rake receiver 133, and the decoder 134. That is, the structures and operations of the forward processor 110 and the reverse processor 130 in the second embodiment of the present invention are the same as shown in FIG. 1A.

The position information generator 121 receives a message from the decoder 134, separates PR information generated in the mobile station from the received message, calculates GPS position information of the mobile station from the PR information, and generates the position coordinates of the mobile station. The array signal processor 122 includes the relative coordinates calculator 300, the position angle calculator 301, a distance calculator 400, a beam width controller 401, and a weight vector calculator 402. The array signal processor 122 calculates weight vectors for the transmission/reception antenna array from the GPS position information received from the position information generator 121 to form transmission/reception beams and feeds the weight vectors to the transmission beamformer 113 and the reception beamformer 132.

The relative coordinates calculator 300 obtains the relative coordinates of the mobile station with respect to the position of the base station from the position coordinates of the mobile station received from the position information generator 121. The position angle calculator 301 calculates the position angle of the mobile station with respect to the base station from the relative coordinates of the mobile station. The distance calculator 400 calculates the 2D or 3D distance between the mobile station and the base station using the relative coordinates of the mobile station. The beam width controller 401 controls a beam width according to the distance. The weight vector calculator 402 calculates optimum weight vectors using the position angle of the mobile station and the beam width control information and feeds the weight vectors to the transmission beamformer 113 and the reception beamformer 132.

The difference between the first and second embodiments in structure lies in use of the distance calculator 400 and the beam width controller 401 and processing the output of the beam width controller 401 in the weight vector calculator 402. While the signal processor 120 calculates the position angle of the mobile station in the same manner as in the first embodiment, it further calculates the distance between the base station and the mobile station and reflects the position angle and the distance in calculating weight vectors. Therefore, only the operations of the distance calculator 400 and the beam width controller 401 will be described below.

The distance calculator 400 of the signal processor 120 calculates the distance between the mobile station and the base station $$\left(R = \sqrt{x_M^2 + y_M^2 + z_M^2}\right)$$

using the relative coordinates ($x_M$, $y_M$, $z_M$) of the mobile station and the beam width controller 401 determines the width of a beam based on the distance. For mobile stations near the base station, beams are formed to be wide, and for mobile stations far from the base station, beams are formed to be narrow. The reason for beam width control is that the local scattering effect causes very large spread of angle of arrival for a nearby mobile station and small angular spread for a remote mobile station. Then, the weight vector calculator 402 calculates optimum transmission/reception weight vectors using the position angle and the distance.

Beam width can be controlled in the following way. Since a minimum beam width $B_{min}$ is given depending on the number and arrangement of the antenna devices, only the way the beam width is increased will be described. It is assumed that a beam width increment is ΔB and a beam was formed using a unit weight vector w in the direction of φ. To increase the beam width by integer multiple x of ΔB the mobile station gets nearer to the base station, a unit weight vector $\omega_{\pm i}$ (i=1, 2, . . . , x−1) is calculated to form a beam in the direction of $$\phi \pm i\frac{\Delta B}{2} (i = 1, 2, \ldots, x-1)$$

and a new unit weight vector $\omega_{inc}$ with an increased beam width is calculated by linear combination of the above branch beam patterns as follows.

$$w_{inc} = \frac{w + \sum_{i=1}^{x-1} w_{+i} + w_{-i}}{\left\| w + \sum_{i=1}^{x-1} w_{+i} + w_{-i} \right\|} \tag{9}$$

For the above beam width control, the beam width controller 401 determines a beam width increment predetermined empirically or by calculation according to the distance to the mobile station and the weight vector calculator 402 calculates transmission/reception weight vectors by Eq. 9.

Referring to FIG. 8, the decoder 134 of the reverse processor 130 in the base station generates a decoded input message in step 451. The signal processor 120 separates the PR information from the input message in step 453 and generates the orthogonal position coordinates ($x'_M$, $y'_M$, $z'_M$) of the mobile station from the PR information using the known GPS ephemeris in step 455. In step 457, the signal processor 120 calculates the relative position coordinates ($x_M$, $y_M$, $z_M$) of the mobile station with respect to the known position coordinates of the base station from the orthogonal position coordinates ($x'_M$, $y'_M$, $z'_M$) of the mobile station.

The signal processor 120 calculates the position angle ($\theta$, $\phi$) of the mobile station with respect to the base station using the relative position coordinates ($x_M$, $y_M$, $z_M$) of the mobile station by Eq. 1 in step 459, calculates the distance between the mobile station and the base station using the relative coordinates ($x_M$, $y_M$, $z_M$) of the mobile station by $$R = \sqrt{x_M^2 + y_M^2 + z_M^2}$$

in step 461, and determines a beam width based on the distance in step 463.

The signal processor 120 calculates the weight vectors from the position angle ($\theta$, $\phi$) and the beam width control information in step 465. The transmission beamformer 113 and the reception beamformer 132 form a transmission beam and a reception beam according to the weight vectors in the direction of the mobile station in step 467.

DB Type (Third Embodiment)

Figure 5:
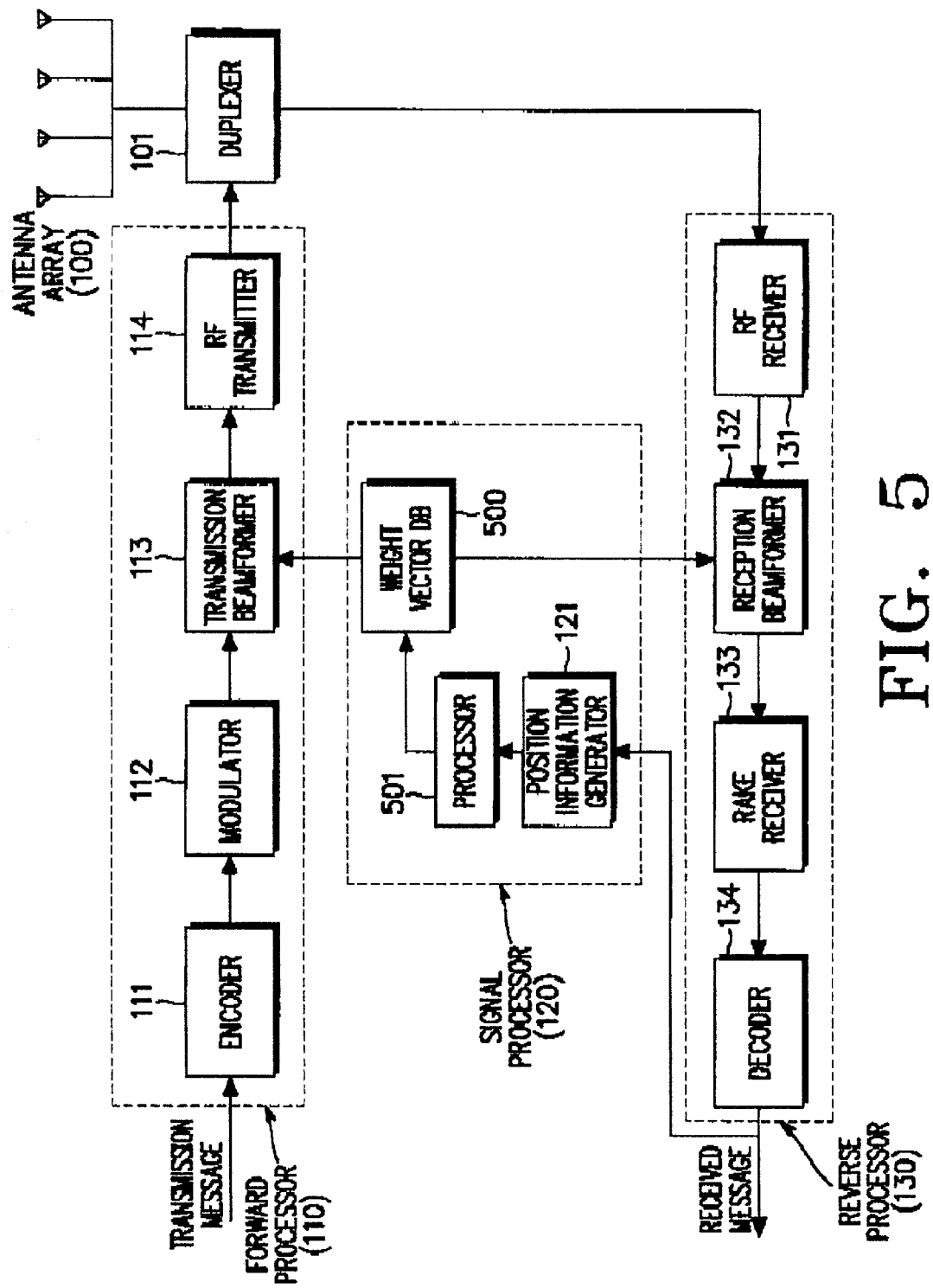
FIG. 5 is a block diagram of a third embodiment (DB type) of the antenna array apparatus for forming a transmission/reception beam using a GPS signal in the mobile communication system according to the present invention.
Figure 9:
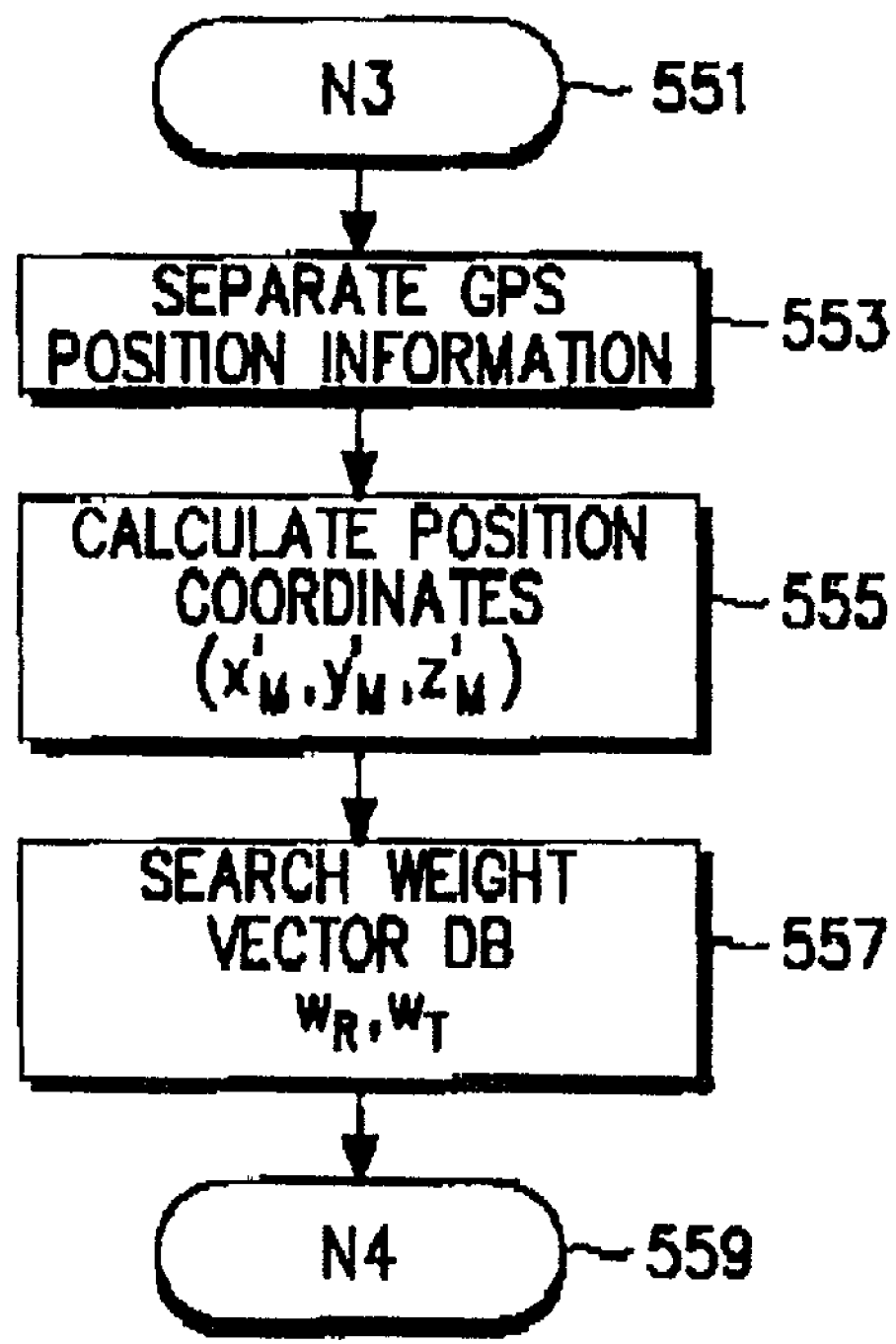
FIG. 9 is a flowchart illustrating transmission/reception beamforming using a GPS signal in the antenna array apparatus of the base station according to the third embodiment of the present invention.

FIGS. 5 and 9 illustrate respectively the structure and operation of a base station according to a third embodiment of the present invention. In accordance with the third embodiment, the base station has a weight vector database, obtains the absolute coordinates of the mobile station from GPS information received from the mobile station, and searches the weight vector database for a weight vector corresponding to the absolute position coordinates of the mobile station.

In the base station, a transmission message is transmitted through the encoder 111, the modulator 112, the transmission beamformer 113, the RF transmitter 114, the duplexer 101, and the antenna array 100. A message received from the mobile station through the antenna array 100 is recovered through the duplexer 101, the RF receiver 131, the reception beamformer 132, the rake receiver 133, and the decoder 134. That is, the structures and operations of the forward processor 110 and the reverse processor 130 in the third embodiment of the present invention are the same as shown in FIG. 1A.

The position information generator 121 receives a message from the decoder 134, separates PR information generated in the mobile station from the received message, calculates GPS position information of the mobile station from the PR information, generates the absolute position coordinates of the mobile station, and feeds the absolute position coordinates to a processor 501. The processor 501 detects weight vectors most approximate to the absolute position coordinates among weight vectors versus position coordinates in a weight vector database 500 and feeds the detected weight vectors to the transmission beamformer 113 and the reception beamformer 132, which form a transmission beam and reception beam in the direction of the mobile station according to the weight vectors.

The difference between the first and third embodiments is that the array signal processor 122 is replaced by the processor 501 and the weight vector database 500 in the latter. The weight vector database 500 stores optimum transmission/reception weight vectors obtained by calculation or empirically with respect to predetermined positions within a cell of the base station. The processor 501 directly outputs a transmission/reception weight vector corresponding to position coordinates most approximate to those of the mobile station without any calculation. For example, the weight vector database 500 stores information in the following form.

TABLE 1

| Position coordinates 1 | Weight vector 1 |
| Position coordinates 2 | Weight vector 2 |
| Position coordinates 3 | Weight vector 3 |
| ... | ... |

The processor 501 calculates the Euclidian distance between the input position coordinates and each position coordinates stored in the weight vector database 500 and selects a weight vector corresponding to the position coordinates with the smallest Euclidian distance in the weight vector database 500. On the other hand, the weight vector database may store the following sector information.

TABLE 2

| Angle 1 of sector 1 | Angle 2 of sector 1 | Distance 1 of sector 1 | Distance 2 of sector 1 | Weight vector 1 |
| Angle 1 of sector 2 | Angle 2 of sector 2 | Distance 1 of sector 2 | Distance 2 of sector 2 | Weight vector 2 |
| Angle 1 of sector 2 | Angle 2 of sector 3 | Distance 1 of sector 3 | Distance 3 of sector 3 | Weight vector 3 |
| ... | ... | ... | ... | ... |

In Table 2, angle 1 of sector i is an azimuth angle at which an ith sector starts and angle 2 of sector i is an azimuth angle at which the ith sector ends. Distance 1 of sector i is the distance between a mobile station and the base station where the ith sector starts and distance 2 of sector i is the distance between the mobile station and the base station where the ith sector ends. If the weight vector database 500 stores the above sector information, the processor 501 calculates the azimuth angle $\phi$ of the mobile station and the distance R between the mobile station and the base station using the received position coordinates and searches for an ith sector satisfying the condition expressed as Eq. 10 in the weight vector database 500.

angle 1 of sector i<θ<angle 2 of sector i distance 1 of sector i<R<distance 2 of sector i       (10)

The processor 501 detects a weight vector for the searched ith sector in the weight vector database 500 and outputs the weight vector.

Referring to FIG. 9, the decoder 134 of the reverse processor 130 in the base station generates a decoded input message in step 551. The signal processor 120 separates the PR information from the input message in step 553 and generates the orthogonal position coordinates ($x'_M$, $y'_M$, $z'_M$) of the mobile station from the PR information using the known GPS ephemeris in step 555. In step 557, the signal processor 120 detects weight vectors corresponding to the position coordinates in the weight vector database 500. The signal processor 120 controls the transmission beamformer 113 and the reception beamformer 132 to form a transmission beam and a reception beam according to the weight vectors in the direction of the mobile station in step 559.

In accordance with the present invention, a base station in a mobile communication system using an antenna array easily calculates a weight vector for transmission/reception beamforming based on the GPS information of a mobile station received from the mobile station without much increase in calculation requirements in both the mobile station and the base station. Therefore, transmission/reception power is minimized, communication quality is improved, and as a result, the capacity of the mobile communication system is increased.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmission antenna array apparatus of a base station in a mobile communication system having a mobile station that receives GPS (Global Positioning System) position information of the mobile station from satellites and outputs the GPS information representative of the absolute position of the mobile station, the apparatus comprising:
   a position information generator for receiving the GPS position information from the mobile station and generating position information of the mobile station;
   an array signal processor for calculating a weight vector using the position information to form a transmission beam; and
   a forward processor having a transmission beamformer, for forming the transmission beam according to the weight vector in the direction of the mobile station through the transmission beamformer and outputting a transmission message to the antenna array by the transmission beam,
   wherein the weight vector is an optimum transmission array weight vector calculated by $W_T = k_T a(\theta, \phi, \lambda_T)$ where $w_T$ is the weight vector for the transmission array, $k_T$ is an arbitrary positive real number, and $\lambda_T$ is the wavelength of the transmission signal and $\theta$ is an elevation angle of the z axis by a position data the mobile station receives from the satellite and $\Phi$ is an azimuth angle by a position data that the mobile station receives from the satellites.

2. The transmission antenna array apparatus of claim 1, wherein the transmission beamformer forms transmission beams by generating as many transmission signals as M antenna devices by duplicating the transmission signal and multiplying each duplicate signal by a corresponding forward weight generated from the array signal processor, wherein M is a number of antenna devices.

3. A reception antenna array apparatus of a base station in a mobile communication system having a mobile station that receives GPS position information of the mobile station from satellites and outputs the GPS information representative of the absolute position of the mobile station, the apparatus comprising:
   a position information generator for receiving the GPS position information from the mobile station and generating position information of the mobile station;
   an array signal processor for calculating a weight vector using the position information to form a reception beam; and
   a reverse processor having a reception beamformer, for forming the reception beam according to the weight vector in the direction of the mobile station through the reception beamformer and processing a message received through the antenna array by the reception beam,
   wherein the weight vector is an optimum reception array weight vector calculated by $W_R = k_R a(\theta, \phi, \lambda_R)$ where $W_R$ is the weight vector for the reception array, $k_R$ is an arbitrary positive real number, and $\lambda_R$ is the wavelength of the received signal and $\theta$ is an elevation angle of the z axis by a position data the mobile station receives from the satellite and $\Phi$ is an azimuth angle by a position data that the mobile station receives from the satellites.

4. The reception antenna array apparatus of claim 3, wherein the reception beamformer obtains a final array output signal by receiving signals through M antenna devices, multiplying each antenna device output signal by a corresponding reverse weight generated from the array signal processor, and summing the multiplied signals, wherein M is a number of antenna devices.

* * * * *

UNITED STATES PATENT AND TRADEMARK OFFICE
CERTIFICATE OF CORRECTION

PATENT NO. : 7,013,165 B2 Page 1 of 1
APPLICATION NO. : 09/931129
DATED : March 14, 2006
INVENTOR(S) : Jae-Seung Yoon et al.

It is certified that error appears in the above-identified patent and that said Letters Patent is hereby corrected as shown below:

Title page, item (30) Foreign Application Priority Data:

"2000-4" should be --2000-47256--.

Signed and Sealed this

Twelfth Day of December, 2006

JON W. DUDAS
*Director of the United States Patent and Trademark Office*